Oct. 29, 1935.   H. E. VAN VOORHEES   2,019,105
WINDOW SCREEN FOR AUTOMOTIVE VEHICLES
Filed Sept. 5, 1933   3 Sheets-Sheet 1
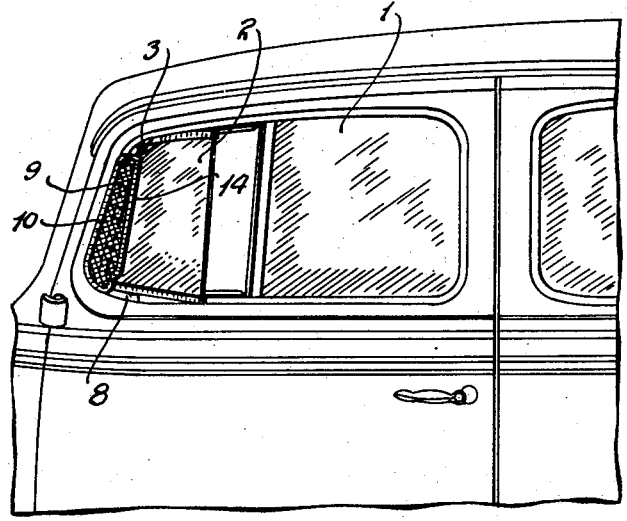
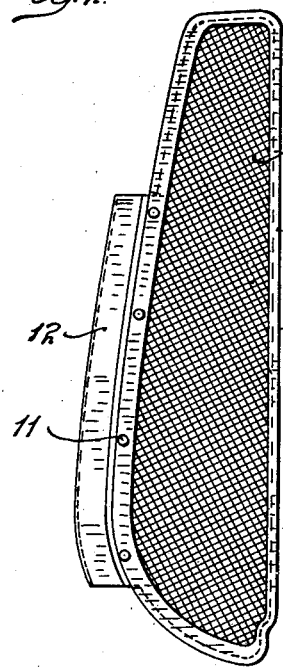
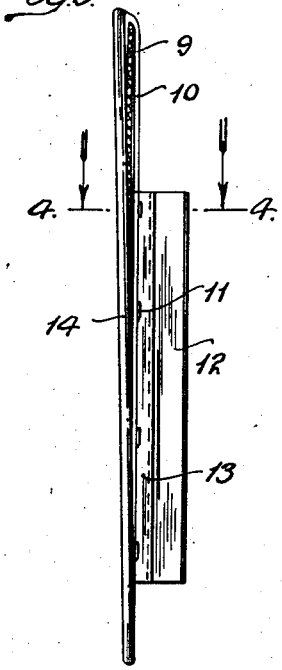
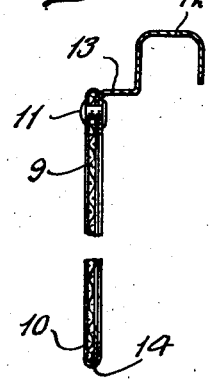
INVENTOR.
HAROLD E. VAN VOORHEES.
BY Barnes, Kisselle
and Laughlin.
ATTORNEYS.

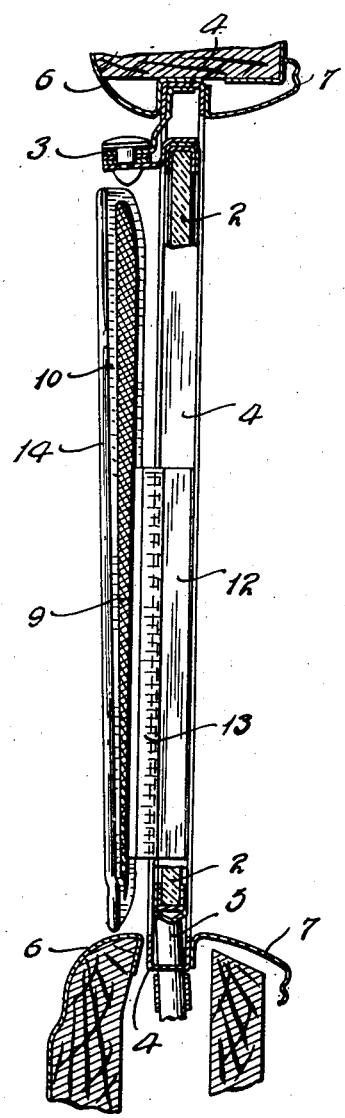
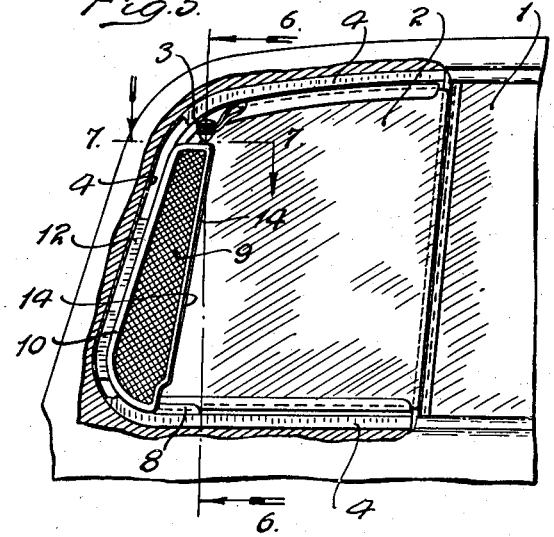
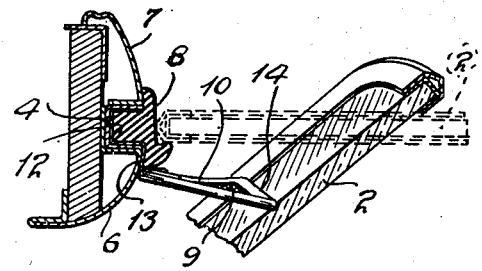

Oct. 29, 1935.   H. E. VAN VOORHEES   2,019,105
WINDOW SCREEN FOR AUTOMOTIVE VEHICLES
Filed Sept. 5, 1933   3 Sheets-Sheet 3
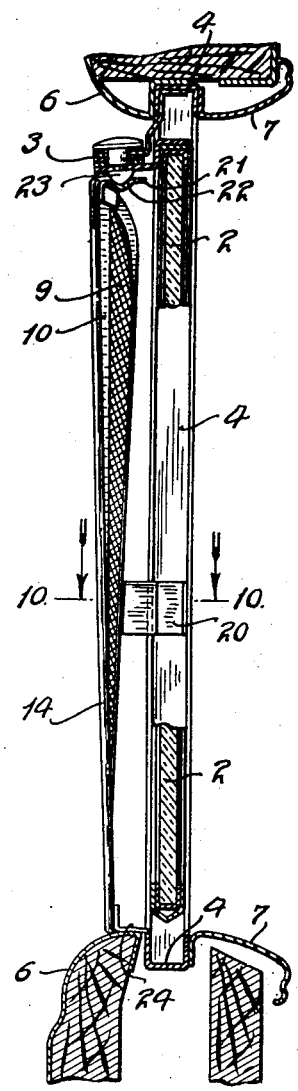
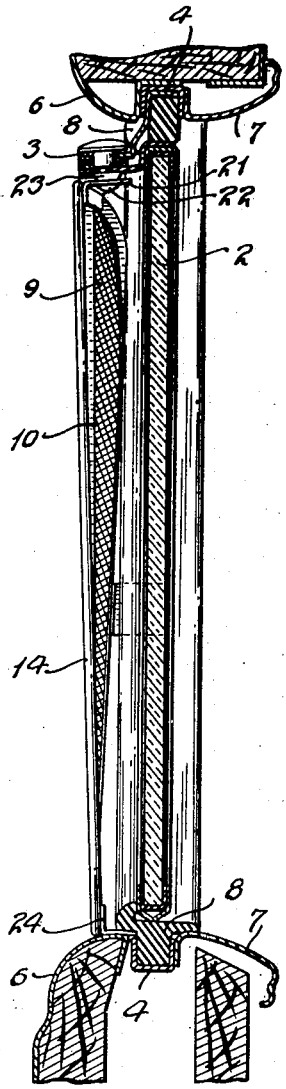
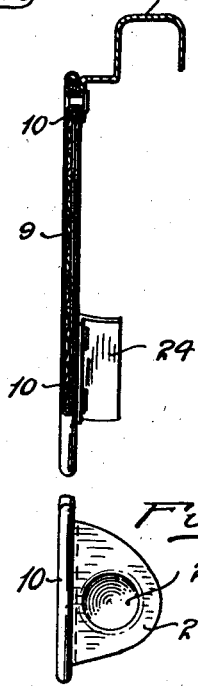
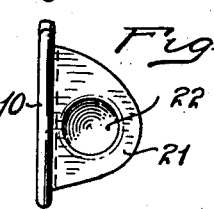
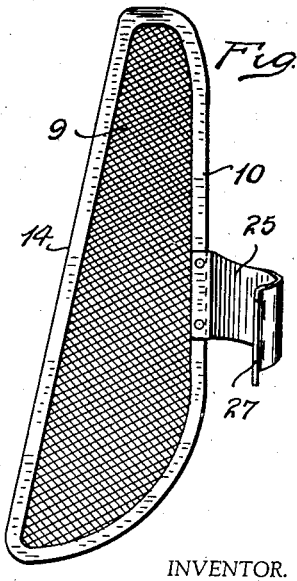
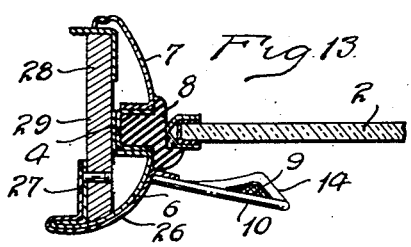
INVENTOR.
HAROLD E. VAN VOORHEES.
BY Barnes, Kisselle and Laughlin
ATTORNEYS.

Patented Oct. 29, 1935

2,019,105

UNITED STATES PATENT OFFICE 2,019,105

WINDOW SCREEN FOR AUTOMOTIVE VEHICLES

Harold E. Van Voorhees, Windsor, Ontario, Canada, assignor to Ternstedt Manufacturing Company, Detroit, Mich., a corporation of Michigan Application September 5, 1933, Serial No. 688,155

6 Claims. (Cl. 156—14)

This invention relates to a screen for a window opening of an automotive vehicle.

It is appreciated that it is old to provide a screen for the window opening of an automotive vehicle both where the window panel is slidable upwardly and downwardly to open and closed position as well as where the window is swingable to open and closed position. This invention is more particularly concerned with a screen for that portion of the window opening which is forward of the pivots of the swinging panel in the Fisher No-Draft Ventilation System for an automotive vehicle which is described and claimed in copending application Serial No. 644,622, filed November 28, 1932.

It has been found with this type of ventilation system that when the window panel has been swung from closed position through more than 90° to scoop position that upon certain occasions bugs will be thrown into the car. It is the purpose of this invention to provide a screen for that portion of the window opening forward of the pivots of the pivoted panel which is neat in appearance, simple to install, and which will permit the swinging panel to be swung from its normally closed position to its normally full open or scoop position.

It is an object of this invention to produce such a screen and utilize the weatherstrip and weatherstrip channel for securing the screen in place.

In the drawings:

Fig. 1 is a fragmentary side elevation of a vehicle body showing the screen in position with the pivoted panel swung slightly open.

Fig. 2 is a detail side elevation of the screen.

Fig. 3 is an end elevation of the screen.

Fig. 4 is a section along the line 4—4 of Fig. 3.

Fig. 5 is a fragmentary side elevation showing the screen in position before the weatherstrip is inserted in the weatherstrip channel to anchor the screen in place.

Fig. 6 is a vertical section through the window assembly along the line 6—6 of Fig. 5.

Fig. 7 is a section along the line 7—7 of Fig. 5 but with the swinging panel swung to scoop position.

Fig. 8 is a view similar to Fig. 6 showing a modified form of the screen before the weatherstrip is installed.

Fig. 9 is a view similar to Fig. 6 after the weatherstrip is installed.

Fig. 10 is a section along line 10—10 of Fig. 8.

Fig. 11 is a detail of the modified form of screen showing socket for engaging the top panel pivot.

Figs. 12 and 13 are details of another modified form of screen.

Referring more particularly to the drawings there is shown a type of window assembly such as described and claimed in the above mentioned application. This type of window assembly comprises a sliding panel 1 and a panel 2 pivoted at its top and bottom edges between its front and rear edges to swing about an upright axis. The panel 2 has an offset pivot 3 at its top edge which is fixedly mounted on the weatherstrip channel 4. The panel is supported at its bottom edge on the shaft 5 which passes through an opening in the bottom portion of the channel 4 and in turn is supported by a suitable window regulator (not shown). The weatherstrip channel 4 is fixed within the window opening between the reveal 6 and the garnish moulding 7, and extends along the window opening adjacent the top, front and bottom edges of the swinging panel 2 (Fig. 5). The channel member 4 has cemented therein the weatherstrip 8 for sealing the top, front and bottom edges of the swinging panel 2. The swinging panel 2, weatherstrip channel 4, and weatherstrip 8 are assembled on the bench into a single unit and then installed into the window opening as a unit, as brought out in copending application Serial No. 670,248, filed May 10, 1933.

Since the window panel 2 can be swung about its axis to scoop position so that the portion of the panel to the front of the pivot swings inwardly of the body and the portion to the rear outwardly through an arc of more than 90°, it is desirable on some occasions to provide the opening in front of the pivots with a screen to prevent bugs from being blown into the body. It is desirable that such a screen may be readily assembled into the window opening and should not interfere with the swinging of the pivoted panel. To this end it is proposed to provide the screen 9 within the peripheral frame 10 which has secured thereto in any suitable fashion, such as by the rivets 11, the channel member 12. It will be noted that the channel member 12 (Figs. 3 and 4) is offset from the screen 9 by the portion 13.

Inasmuch as the top pivot 3 is offset outwardly from the plane of the panel 2 whereas the shaft 5 supports the window at its lower edge as the window is swung outwardly to scoop position, as shown in Fig. 7, the swinging panel will be inclined outwardly of the window opening from its bottom to its top edges. To accommodate this inclination of the panel the screen is twisted so that the rear edge 14, which remains straight, is inclined outwardly of the window opening from the bottom to the top (Fig. 7), substantially parallel to the axis of the panel which axis runs through shaft 5 outwardly and upwardly through pivot 3. Thus, the panel 2 swings around rear edge 14 of the screen when swung from closed to open position. Therefore, when the window is swung to open scoop position the rear edge 14 of the screen will fit closely enough to the swinging panel so that it has approximately one-sixteenth of an inch clearance.

At the same time when the swinging panel 2 is swung open anywhere between closed position and scoop position, owing to the offset of the pivot 3, the plane of the panel will be inclined somewhat rearwardly from bottom to top. To accommodate this the rear edge 14 of the screen is inclined rearwardly from the bottom to the top and is clearly shown in Fig. 5.

The screen may be assembled either before or after the swinging panel is mounted in the window opening. Where the screen is assembled prior to the assembly of the swinging panel in the window opening the channel bracket 12 is inserted in the channel 4 and then the weatherstrip 8 is cemented in position in the channel 4, thus locking the screen securely in place. The weatherstrip, of course, fits into the chanel bracket 12 (Fig. 7). Thus the channel bracket 12, which extends along a substantial portion of the front edge of the screen 10, is locked into the rubber weatherstrip retaining channel 4 by the weatherstrip 8. Inasmuch as the support bracket channel 12 is made of thin metal it will bend to permit the screen to be adjusted in and out to secure the proper clearance between the screen and the panel.

If the screen is assembled to the window opening as an accessory after the swinging panel unit assembly has been installed, the weatherstrip 8 must be removed prior to inserting the channel bracket 12 in the weatherstrip channel 4, whereupon the weatherstrip 8 may be replaced to lock the screen in position as above described. In either instance the screen is simply and easily installed and the channel support bracket 12 concealed thus making the screen very neat in appearance.

A modified form of the screen is shown in Figures 8 to 11. In this form the screen per se is the same as that shown in the principal form of the invention. In this modified form the channel support bracket 20 is similar to the channel support bracket 12 of the principal form except that instead of extending along a substantial portion of the front edge of the screen 10 it merely extends throughout an inch or so. To provide additional support for the screen an angle bracket 21 having a socket 22 for receiving the end 23 of the offset pivot 3 is riveted or otherwise suitably secured to the top of the screen frame 10. The bottom edge of the screen frame is provided with an angle clip or lug 24. This modified form of screen is assembled the same as the principal form, as above described, and in addition the socket 22 yieldably engages the offset pivot 23 and the clip 24 is locked between the reveal 6 and the weatherstrip 8 as shown in Fig. 9. Hence the channel support bracket 20 in conjunction with the socket 22 and clip 24 secure the screen neatly and tightly in place.

In Figures 12 and 13 there is shown a second modified form which differs again only in the manner in which it is secured in place. In this form the screen frame 10 has riveted or otherwise suitably secured thereto the bracket 25 which is curved as at 26 to fit around the reveal 6 and which has a return bent portion with an outwardly projecting flange 27 which fits against the outer face 28 of the pillar 29. The flange 27 is provided with two screw holes. The pillar 29 is drilled and tapped thus permitting the flange 27 to be screwed to the pillar 29 to hold the screen 10 securely in place.

I claim:

1. A unitary window and screen assembly for a vehicle body window opening comprising in combination a channel member, a swingable panel pivotally supported by the said channel member to swing therein, a weatherstrip mounted in the said channel for sealing the edges of the swingable panel, a screen for the said swingable panel, and support means for the said screen interengaged between the weatherstrip and weatherstrip retaining channel for holding the screen in place, the said screen, swingable panel, weatherstrip, and retaining channel being assembled into the window opening as a unit.

2. In a window assembly, a channel frame extending along the top, bottom and front edges of the window opening, a swingable panel pivotally mounted in the said frame at its top and bottom edges between its front and rear edges, a weatherstrip arranged to be seated in the said channel frame to seal the edges of the window panel, a screen for screening the portion of the window opening in front of the said pivots when the panel is in open position, and a channeled support bracket for the said screen having its channel offset from the plane of the screen and extending throughout a substantial portion of the front edge of the screen arranged to be received within the weatherstrip channel and held therein by the said weatherstrip.

3. In a window assembly comprising a swingable panel pivoted at its top and bottom edges between its front and rear edges, a screen for screening the portion of the window opening in front of the pivots when the window panel is swung to open position, a weatherstrip for sealing an edge of the said panel when in closed position, and support means in the form of a channel bracket extending along a portion of the weatherstrip and for receiving such portion whereby the screen is held in place by said weatherstrip.

4. In a window assembly comprising a swingable panel pivoted at its top and bottom edges between its front and rear edges, one of said pivots being offset from the plane of the window opening and the other pivot being in the plane of the window opening whereby the panel is inclined outwardly from bottom to top when swung to open position, a screen for closing the portion of the window opening forward of the pivots having its rear edge inclined outwardly of the window opening from bottom to top to accommodate itself to the inclination of the swinging panel when swung to open position.

5. In a window assembly, a swingable panel pivoted at its top and bottom edges between its front and rear edges, one of said pivots being offset from the plane of the window panel, a screen for closing the portion of the window opening in front of the said pivots, and support means for securing the said screen in position including a yieldable socket member on the upper edge of the screen for engaging the offset pivot, and a clip on the bottom edge of the screen for engaging the window opening reveal.

6. In a window assembly, a swingable panel pivoted at its top and bottom edges between its front and rear edges, one of said pivots being offset from the plane of the window panel, a screen for closing the portion of the window opening in front of the said pivots, a weatherstrip for sealing the edges of the swingable panel when in closed position, support means for securing the screen in position comprising a bracket member locked in position by the said weatherstrip, a yieldable socket on the upper edge of the screen for engaging the offset pivot, and a clip on the lower edge of the screen for engaging between the reveal and the weatherstrip.

HAROLD E. VAN VOORHEES.